Patented May 17, 1927.

1,629,448

UNITED STATES PATENT OFFICE.

VIGGO DREWSEN, OF BROOKLYN, NEW YORK, ASSIGNOR TO WEST VIRGINIA PULP & PAPER COMPANY, OF NEW YORK, N. Y., A CORPORATION OF DELAWARE.

PROCESS OF MAKING LIGNO-TANNING MATERIAL FROM WASTE SULPHITE LIQUOR.

No Drawing. Application filed February 14, 1919. Serial No. 277,094.

When the waste sulphite liquor produced from the sulphite process of making paper pulp from wood or the like, or the waste liquor material remaining after such waste sulphite liquor has been used for the production of alcohol by the Ekstrom process, is subjected to a conversion treatment comprising cooking at low temperature with a small percentage of caustic lime, the lignine may be converted from its original lignosulphonic acid form into a water soluble ligno-tanning material which can be used for tanning leather either with or without the incorporation in suitable proportions of other material, such as the lacto-lactonic acids which may be simultaneously or separately produced from the waste sulphite liquor.

Waste sulphite liquor may be taken directly from the wood pulp digesters or may be first used for the manufacture of grain alcohol by the Ekstrom process and the waste product similarly used, if desired. Such waste sulphite liquor may be cooked in a digester together with several percent of caustic earthy alkali such as caustic lime, several percent or more of high calcium caustic lime being preferably used in finely divided or powdered form, or in some cases a correspondingly higher proportion of dolomite lime may be used. The cooking takes place under sufficient pressure so that the temperature is about 130° centigrade and half an hour to an hour and a half treatment is usually sufficient, good results being secured when the cooking or boiling takes place for about an hour with two percent of powdered quicklime until the solution shows no substantial sugar reaction, indicating that the sugary components or hemicelluloses have been converted by the caustic lime into non-aldehyde or lactonic acid form. This treatment also effects a precipitation of the ligno-tanning material which is converted into the basic condition through the action of the caustic lime thereon and monosulphites of calcium, etc. are also precipitated.

The treated material may now be filtered, if desired, the liquor containing organic compounds and acids believed to be of the lactonic acid type which are herein designated lacto-lactonic acids, although they are of very complex character and naturally differ somewhat with the particular kind of wood or other fibrous material used for the manufacture of the paper pulp. This filtrate may be evaporated in multiple effect evaporators to the desired density of about 30° Baumé or so. The percentage of combined calcium may then be determined and relatively strong sulphuric acid run in in equivalent proportions to precipitate the lime in the form of calcium sulphate. This may be filtered off and the filtrate containing such lacto-lactonic acids in solution may be used or sold as a tanning material which is especially effective in connection with such sulphonated ligno-tanning material as herein referred to.

The precipitated basic ligno-tanning material which is produced by such preliminary boiling or digestion at low temperature with lime may be incorporated with several volumes of water and carbon-dioxide can be percolated therethrough until the combined lime has been carbonated and precipitated in the form of carbonate of lime which leaves the ligno-tanning material in the form of a neutral salt containing considerable combined sulphur and soluble in water. By heating this mixture up to 120° centigrade or so the surplus amount of carbon-dioxide may be driven off and the precipitate aggregated or gotten into such condition that it filters more easily. On filtering, the lime salts are readily removed and the relatively pure solution of ligno-tanning material may be concentrated to the desired extent and any combined calcium eliminated by adding an equivalent amount of sulphuric acid and filtering off the purified tanning liquor. This sulphonated ligno-tanning material which contains about two percent of sulphur is substantially neutral and is quite soluble in water, and may be used for tanning purposes alone or in combination with such lacto-lactonic acid solution or other suitable tanning agent, such as aluminum sulphate or chromium sulphate if desired. The use of such lacto-lactonic acids in connection therewith seems to very considerably improve its tanning action on leather.

Another method in which such combined tanning materials may in some cases be readily produced in practice is to cook such waste sulphite liquor with two or three percent of caustic lime at a temperature of 130° centigrade or so for about an hour which seems to partly desulphurize the organic compounds with the precipitation of calcium sulphite and basic calcium ligno sulphonates, and then in the same digester, if desired, carbon-dioxide may be percolated through the entire mixture under suitable pressure so that the excess lime in the basic lignine compound is neutralized and combined with the carbon dioxide. When this material is run through a filter press, the precipitate calcium sulphite and calcium carbonate may be removed and the filtrate comprises a solution of neutral water soluble calcium ligno-sulphonated material and also soluble lime salts of such lacto-lactonic acids. The amount of such combined lime may be readily determined and an equivalent amount of sulphuric acid may be added to the mixture so as to precipitate the lime and form the final solution of combined tanning material. This material quite closely resembles the desirable ligno-tanning material produced by the processes previously described. Such combined tanning agents derived from the waste sulphite liquor have shown very good results when subjected to the standard tanning test with hide powder. Samples of this tanning material when shaken up with the regular amount of hide powder for ten minutes showed such amount of precipitation has indicated that some 50 to 54 percent of the solids of the tanning material produced in this way were active tanning agents. When the tanning material was allowed to act on the hide powder for a longer period or when a still larger amount was used still more favorable results were secured; and on 30 minutes tests with slightly more than the standard quantity of hide powder 58 to 60 percent or so of the solids of the tanning material were shown to be active tanning agents. Furthermore, this tanning material has a very desirable and active tanning action on leather, producing smooth and plump leather of desirable quality and good color. If desired, in some cases, however, instead of sulphuric acid aluminum sulphate or chromium sulphate may be added in equivalent proportion which similarly precipitates the lime and also incorporates such aluminum or chromium elements so as to give additional properties to the resulting soluble tanning material. These tanning solutions may of course be further concentrated to such extent as is desirable to facilitate their shipment and sale and additional water can be added thereto when they are used.

This invention has been described in connection with a number of illustrative forms, arrangements, orders of steps, materials, conditions, temperatures, and times of treatment, to the details of which disclosure the invention is not of course to be limited, since what is claimed as new and desired to be secured by Letters Patent is set forth in the following claims.

1. The process of producing a tanning material, comprising cooking waste sulphite liquor with lime at a temperature of about 130° C. until the ligno sulphonic components of the sulphite liquor are partly desulphurized and the sugary components of the sulphite liquor are converted into organic acids, with the formation of a complex precipitate, percolating carbon dioxide through the mass until it is neutralized, thereby precipitating calcium carbonate and calcium sulphite and redissolving various organic precipitated constituents, filtering to remove the precipitate, concentrating and treating the filtrate with an amount of sulphuric acid equivalent to its calcium content, thereby preciptating calcium sulphate and forming a soluble tanning material comprising ligno sulphonic acid in combination with organic acids.

2. In the process of producing a tanning material, cooking waste sulphite liquor with lime at a temperature of about 130° C. until the ligno sulphonic components of the sulphite liquor are partly desulphurized and the sugary components of the sulphite liquor are converted into organic acids, and a complex precipitate is formed, filtering and concentrating and treating the filtrate with an amount of sulphuric acid equivalent to its lime content to precipitate calcium sulphate and filtering to recover organic acids for mixture and use with ligno-tanning material.

3. In the process of producing a tanning material, cooking waste sulphite liquor with lime at a temperature of about 130° C. until ligno-sulphonic components of the sulphite liquor are partly desulphurized and the sugary components of the sulphite liquor are converted into organic acids, and a complex precipitate is formed, filtering to separate the precipitate, suspending it in water and treating it with carbon dioxide, to form calcium carbonate and to redissolve calcium ligno-sulphonic compounds, filtering and concentrating the filtrate, and treating it with an amount of sulphuric acid equivalent to its calcium content to precipitate calcium sulphate and form ligno sulphonic acids for use as a tanning material.

4. The process of producing a tanning material which comprises cooking waste sulphite liquor with lime at a temperature of approximately 130° C., in percolating carbon dioxide through the mass, in filtering the treated mass, and in treating the filtrate with sulphuric acid to produce the desired material.

5. The process of producing a tanning material which comprises cooking waste sulphite liquor with lime at a temperature of approximately 130° C., in filtering the treated mass, in suspending the precipitate in water, in percolating carbon dioxide through the mass, in filtering the material thus treated, and in treating the filtrate with sulphuric acid.

6. The process of producing a tanning material which comprises cooking waste sulphite liquor with lime at a temperature of approximately 130° C., in filtering the mass, and in treating the filtrate with sulphuric acid.

7. The process of producing a tanning material which comprises cooking waste sulphite liquor with lime at a temperature of approximately 130° C., in filtering the mass, in treating the filtrate with sulphuric acid, and in filtering the treated liquor, whereby the resulting filtrate will have the desired tanning characteristics.

VIGGO DREWSEN.